US011035928B2

(12) United States Patent
Subburaj et al.

(10) Patent No.: US 11,035,928 B2
(45) Date of Patent: *Jun. 15, 2021

(54) LOOPBACK TECHNIQUES FOR SYNCHRONIZATION OF OSCILLATOR SIGNAL IN RADAR

(71) Applicant: TEXAS INSTRUMENTS INCORPORATED, Dallas, TX (US)

(72) Inventors: Karthik Subburaj, Bangalore (IN); Brian Ginsburg, Allen, TX (US); Karthik Ramasubramanian, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 375 days.

This patent is subject to a terminal disclaimer.

(21) Appl. No.: 15/642,880

(22) Filed: Jul. 6, 2017

(65) Prior Publication Data

US 2017/0315211 A1 Nov. 2, 2017

Related U.S. Application Data

(63) Continuation of application No. 14/503,181, filed on Sep. 30, 2014, now Pat. No. 9,880,261.

(51) Int. Cl.
*G01S 7/03* (2006.01)
*G01S 7/40* (2006.01)
(Continued)

(52) U.S. Cl.
CPC .............. *G01S 7/032* (2013.01); *G01S 7/036* (2013.01); *G01S 7/40* (2013.01); *G01S 13/87* (2013.01); *G01S 13/931* (2013.01); *H04L 7/04* (2013.01)

(58) Field of Classification Search
CPC .................................. G01S 7/032; G01S 7/036
See application file for complete search history.

(56) References Cited

U.S. PATENT DOCUMENTS

| 8,325,704 B1 | 12/2012 | Lemkin et al. |
| 9,203,480 B2 | 12/2015 | Rahul et al. |
(Continued)

FOREIGN PATENT DOCUMENTS

| CN | 102540190 | 7/2012 |
| CN | 102565789 | 7/2012 |
(Continued)

OTHER PUBLICATIONS

X. Yang, P. Yin and T. Zeng, "Time and phase synchronization for wideband distributed coherent aperture radar," IET International Radar Conference 2013, Xi'an, 2013, pp. 1-5. (Year: 2013).*

(Continued)

*Primary Examiner* — Marcus E Windrich
(74) *Attorney, Agent, or Firm* — John R. Pessetto; Charles A. Brill; Frank D. Cimino

(57) ABSTRACT

The disclosure provides a radar apparatus for estimating a position and a velocity of a plurality of obstacles. The radar apparatus includes a slave radar chip. A master radar chip is coupled to the slave radar chip. The master radar chip includes a local oscillator that generates a transmit signal. The slave radar chip receives the transmit signal on a first path and sends the transmit signal back to the master radar chip on a second path. A delay detect circuit is coupled to the local oscillator and receives the transmit signal from the slave radar chip on the second path and the transmit signal from the local oscillator. The delay detect circuit estimates a routing delay from the transmit signal received from the slave radar chip on the second path and from the transmit signal received from the local oscillator.

20 Claims, 3 Drawing Sheets

(51) Int. Cl.
  *G01S 13/87* (2006.01)
  *H04L 7/04* (2006.01)
  *G01S 13/931* (2020.01)

(56) References Cited

U.S. PATENT DOCUMENTS

| | | | |
|---|---|---|---|
| 2002/0128039 | A1 | 9/2002 | Finn |
| 2005/0159914 | A1* | 7/2005 | Sunden ............. H04W 56/0015 702/125 |
| 2006/0064244 | A1 | 3/2006 | Robbins |
| 2007/0139200 | A1 | 6/2007 | Yushkov et al. |
| 2008/0061891 | A1* | 3/2008 | Hongo ................... G01S 7/35 331/17 |
| 2010/0171648 | A1 | 7/2010 | Himmelstoss et al. |
| 2015/0153445 | A1* | 6/2015 | Jansen ................ G01S 7/032 701/93 |
| 2015/0276918 | A1 | 10/2015 | Ramasubramanian et al. |
| 2016/0025844 | A1* | 1/2016 | Mckitterick ............ G01S 7/35 342/21 |
| 2016/0291130 | A1 | 10/2016 | Ginsburg et al. |
| 2017/0023663 | A1* | 1/2017 | Subburaj ............... G01S 13/931 |
| 2017/0045607 | A1 | 2/2017 | Bharadwaj et al. |
| 2017/0090014 | A1 | 3/2017 | Subburaj et al. |
| 2017/0090015 | A1* | 3/2017 | Breen ................... G01S 7/4056 |
| 2017/0176583 | A1* | 6/2017 | Gulden ................ G01S 13/878 |
| 2018/0024233 | A1* | 1/2018 | Searcy .................. G01S 7/032 342/125 |

FOREIGN PATENT DOCUMENTS

| | | |
|---|---|---|
| EP | 2631666 | 8/2013 |
| SU | 862111 | 9/1981 |
| WO | 9722913 | 6/1997 |

OTHER PUBLICATIONS

European Supplementary Search Report in corresponding European Patent Application No. EP15845699, dated Apr. 24, 2018 (3 pages).
Chinese Search Report from corresponding Chinese Patent Application No. 2015800435650, dated Feb. 3, 2019 (2 pages).
International Search Report in corresponding PCT Application No. PCT/US2015/053364, dated Jan. 28, 2016 (2 pages).

* cited by examiner

LOOPBACK TECHNIQUES FOR SYNCHRONIZATION OF OSCILLATOR SIGNAL IN RADAR

CROSS REFERENCE TO RELATED APPLICATION(S)

This continuation application claims priority to U.S. patent application Ser. No. 14/503,181, filed Sep. 30, 2014, which application is incorporated herein by reference.

TECHNICAL FIELD

Embodiments of the disclosure relate generally to radar apparatus and more particularly to mitigating routing delay of a local oscillator signal in radars.

BACKGROUND

The use of radars in industrial and automotive applications is evolving rapidly. Radars are used in many applications to detect target objects such as airplanes, military targets, vehicles, and pedestrians. Radar finds use in number of applications associated with a vehicle such as collision warning, blind spot warning, lane change assist, parking assist and rear collision warning. Pulse radar and FMCW (Frequency Modulation Continuous Wave) radar are predominately used in such applications.

In a radar system, a local oscillator generates a transmit signal. The transmit signal is amplified and transmitted by one or more transmit units. In an FMCW radar, a frequency of the transmit signal is varied linearly with time. For example, the frequency of the transmit signal increases at a constant rate from 77 GHz to 81 GHz in 100 micro-seconds. This transmit signal is referred as a ramp signal or a chirp signal. An obstacle scatters the transmit signal. The scattered signal is received by one or more receive units in the radar system.

A signal obtained by mixing the transmitted signal and the received scattered signal is termed as a beat signal. The beat signal is sampled by an analog to digital converter (ADC) and processed by a digital signal processor to estimate a distance and a velocity of the obstacle. The frequency of the beat signal is proportional to the range (distance) of the obstacle. For a moving obstacle, a phase of the beat signal varies across multiple ramp signals transmitted by the radar system. The frequency and phase of the beat signal from one or more receive units are analyzed by the digital signal processor to estimate the position and the velocity of the obstacle.

The transmit signal from the local oscillator is provided to the one or more transmit units, and the one or more receiver units, which may be on one or multiple chips and/or semiconductor devices. The one or more transmit or receive units may be located at different distances from the local oscillator which induces different routing delays in the transmit signal from the local oscillator to each transmit or receive unit. Also, the phase of the transmit signal received from the local oscillator at the one or more transmit units or receive units may differ. This causes errors in position and velocity estimation of the obstacle. A radar system with the local oscillator, the one or more transmit units and the one or more receive units on a single chip has a high power consumption, a high heat dissipation and also requires a large area.

SUMMARY

This Summary is provided to comply with 37 C.F.R. § 1.73, requiring a summary of the invention briefly indicating the nature and substance of the invention. It is submitted with the understanding that it will not be used to interpret or limit the scope or meaning of the claims.

An embodiment provides a radar apparatus. The radar apparatus includes a slave radar chip. A master radar chip is coupled to the slave radar chip. The master radar chip includes a local oscillator that generates a transmit signal. The slave radar chip receives the transmit signal on a first path and sends the transmit signal back to the master radar chip on a second path. A delay detect circuit is coupled to the local oscillator and receives the transmit signal from the slave radar chip on the second path and the transmit signal from the local oscillator. The delay detect circuit estimates a routing delay from the transmit signal received from the slave radar chip on the second path and from the transmit signal received from the local oscillator.

Other aspects and example embodiments are provided in the Drawings and the Detailed Description that follows.

BRIEF DESCRIPTION OF THE VIEWS OF DRAWINGS

DETAILED DESCRIPTION OF THE EMBODIMENTS

Figure 1:
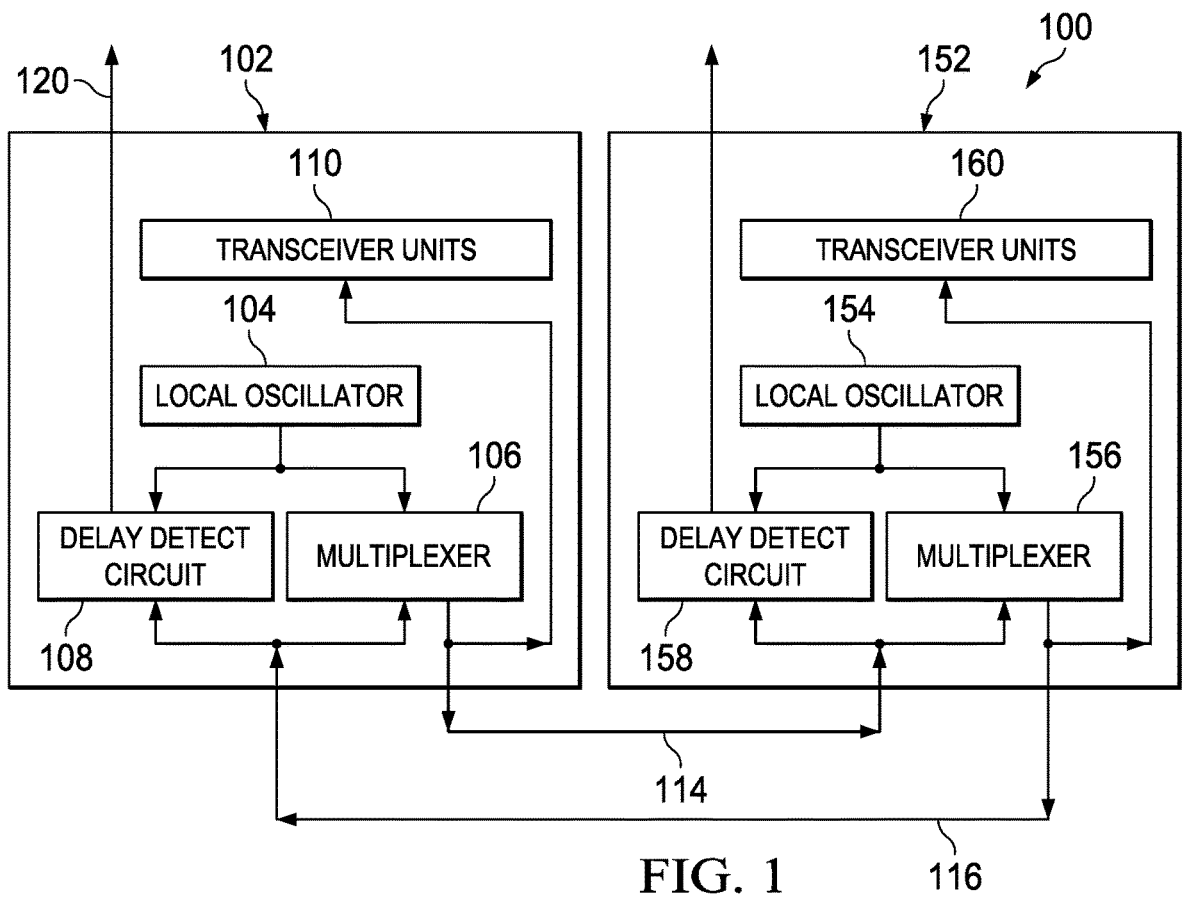
FIG. 1 illustrates a radar apparatus, according to an embodiment

FIG. 1 illustrates a radar apparatus 100, according to an embodiment. The radar apparatus 100 includes a master radar chip 102 and a slave radar chip 152. The master radar chip 102 includes a local oscillator 104. A multiplexer 106 is coupled to the local oscillator 104. A plurality of transceiver units 110 are coupled to the multiplexer 106. Each transceiver unit of the plurality of transceiver units 110 includes at least one of a transmit unit and a receive unit. In one example, a transceiver unit of the plurality of transceiver units 110 includes one or more transmit units. In another example, a transceiver unit of the plurality of transceiver units 110 includes one or more receive units. In yet another example, a transceiver unit of the plurality of transceiver units 110 includes one or more transmit units and one or more receive units. A delay detect circuit 108 is coupled to the local oscillator 104.

The slave radar chip 152 includes a local oscillator 154. A multiplexer 156 is coupled to the local oscillator 154. A plurality of transceiver units 160 are coupled to the multiplexer 156. Each transceiver unit of the plurality of transceiver units 160 includes at least one of a transmit unit and a receive unit. In one example, a transceiver unit of the plurality of transceiver units 160 includes one or more transmit units. In another example, a transceiver unit of the plurality of transceiver units 160 includes one or more receive units. In yet another example, a transceiver unit of the plurality of transceiver units 160 includes one or more transmit units and one or more receive units.

A delay detect circuit 158 is coupled to the local oscillator 154. In an embodiment, the radar apparatus 100 includes a plurality of radar chips and one or more radar chips of the plurality of radar chips are configured as master radar chips and one or more radar chips of the plurality of radar chips are configured as slave radar chips.

As illustrated in the radar apparatus 100, in one example, the master radar chip 102 and the slave radar chip 152 are similar in connections i.e. the master radar chip 102 and the slave radar chip 152 are identical. Hence, a chip manufacturer has to manufacture only one kind of chip and a user can program these chip according to the usage in the respective designs. In another example, the master radar chip 102 and the slave radar chip 152 are not identical, and may contain different number of transceiver units. Also, the local oscillator may be present only in the master radar chip 102.

In yet another example, a user programs one chip as a master radar chip and the remaining chips on the radar apparatus 100 as slave radar chips by activating a local oscillator on the master radar chip and deactivating a local oscillator on the slave radar chips and accordingly configuring multiplexer select signals. In one version, the plurality of transceiver units 110 and the local oscillator 104 in the master radar chip 102 are integrated on a single chip. Similarly, the plurality of transceiver units 160 and the local oscillator 154 in the slave radar chip 152 are integrated on a single chip.

Therefore, in architectures such as architecture of the radar apparatus 100, the plurality of transceiver units are split on two chips i.e. on the master radar chip 102 and the slave radar chip 152. This reduces the overall area required by each chip and also reduces the power consumption and heat dissipation of each chip, hence resulting in lower chip cost and lower cost of the radar apparatus 100. The radar apparatus 100 may include one or more additional components known to those skilled in the relevant art and are not discussed here for simplicity of the description.

The operation of radar apparatus 100 illustrated in FIG. 1 is explained now. The radar apparatus 100 works in a normal mode and a calibration mode. It is to be noted that the radar apparatus 100 can work in a plurality of modes. However, for ease of understanding and brevity of the description, only normal mode and calibration mode are described here. In normal mode, the radar apparatus 100 detects a position and a velocity of surrounding obstacles. The normal mode is known to those skilled in the relevant art and hence not discussed here for simplicity of the description. The calibration mode is explained now.

In calibration mode, the local oscillator 104 in the master radar chip 102 generates a transmit signal. The multiplexer 106 in the master radar chip 102 receives the transmit signal from the local oscillator 104. The multiplexer 106 sends the transmit signal to the slave radar chip 152 on a first path 114. The multiplexer 106 also provides the transmit signal to the plurality of transceiver units 110 in the master radar chip 102.

The slave radar chip 152 receives the transmit signal from the master radar chip 102 on the first path 114. The multiplexer 156 receives the transmit signal on the first path 114 from the master radar chip 102. The multiplexer 156 sends the transmit signal back to the master radar chip 102 on a second path 116. The multiplexer 156 also provides the transmit signal to the plurality of transceiver units 160 in the slave radar chip 152.

A path from the multiplexer 106 in the master radar chip 102 to the multiplexer 156 in the slave radar chip 152 is the first path 114 and a path from the multiplexer 156 in the slave radar chip 152 to the multiplexer 106 in the master radar chip 102 is the second path. In an example, the path from the multiplexer 106 in the master radar chip 102 to the multiplexer 156 or the delay detect circuit 158 in the slave radar chip 152 is the first path 114 and the path from the multiplexer 156 in the slave radar chip 152 to the multiplexer 106 or the delay detect circuit 108 in the master radar chip 102 is the second path.

In one version, a length of the first path 114 is equal to a length of the second path 116. In another version, the values of the length of the first path 114 and the length of the second path 116 are pre-stored in a storage in the master radar chip 102 and used by delay detect circuit 108 for further computations. In yet another version, the delay detect circuit 158 and the local oscillator 154 in the slave radar chip 152 are deactivated.

In an example, the multiplexer 106 send the transmit signal to the slave radar chip 152 through an output buffer. The output buffer amplifies the transmit signal so as to compensate for a routing loss incurred by the transmit signal while traversing from the master radar chip 102 to the slave radar chip 152. In another example, the multiplexer 156 receives the transmit signal from the master radar chip 102 through an input buffer. The input buffer amplifies the transmit signal so as to compensate for a routing loss incurred by the transmit signal while traversing from the master radar chip 102 to the slave radar chip 152.

In one example, a frequency of the transmit signal sent and received by the master radar chip 102 on the first path 114 and the second path 116 is equal to a frequency of the local oscillator 104. The frequency of the local oscillator 104 is one of the following ranges, but not limited to 76 GHz to 81 GHz or 18 GHz to 24 GHz. The frequency of the local oscillator 104, in one example, is dependent on an operating frequency band of the radar apparatus 100.

In another example, the frequency of the transmit signal sent by the master radar chip 102 on the first path 114 and the frequency of the transmit signal sent by the slave radar chip 152 on the second path 116 is divided by an integer factor. For example, the integer factor is one of (but not limited to) 2, 3, and 20. Frequency divider circuits are used to generate a divided frequency signal. Frequency division is advantageous as it provides reduction in power loss during routing of transmit signal in printed circuit boards.

The transmit signal received by the master radar chip 102 on the second path 116 and the transmit signal received by the slave radar chip 152 on the first path 114 are multiplied by the same integer factor to match the frequency of the transmit signal from the local oscillator 104. Frequency multiplier circuits, such as phase lock loops, frequency lock loops and self-mixers are used to realize the above mentioned frequency multiplication.

The delay detect circuit 108 in the master radar chip 102 receives the transmit signal from the slave radar chip 152 on the second path 116. The delay detect circuit 108 also receives the transmit signal from the local oscillator 104. The delay detect circuit 108 estimates a routing delay from the transmit signal received from the slave radar chip on the second path 116 and the transmit signal received from the local oscillator 104. The delay detect circuit 108 provides the routing delay to a processing device in the radar apparatus 100 on a signal path 120.

Routing delay is a time taken by the transmit signal on the first path 114 from the multiplexer 106 to the multiplexers 156 and back from the multiplexer 156 to the multiplexer 106 on the second path 116. In one example, a phase of the transmit signal from the local oscillator 104 and a phase of the transmit signal received from the slave radar chip 152 on the second path 116 are equal. In an example, the processing device is a digital signal processor (DSP) in the radar apparatus 100. In another example, the processing device is a DSP in at least one of a transceiver unit of the plurality of transceiver units 110. The processing device utilizes the routing delay during estimate of a position and a velocity of a plurality of obstacles.

The operation of the delay detect circuit is explained later in the description in connection with FIG. 2(a) and FIG. 2(b). In one version, the radar apparatus 100 works in calibration mode when the local oscillator 104 is not generating a signal for normal mode. In another version, during functioning in normal mode, the local oscillator 104 is idle for defined time intervals in which radar apparatus 100 is made to work in calibration mode. In yet another version, the calibration mode is exercised in conjunction with the normal mode such that the local oscillator 104 function is conducive to both the normal and the calibration mode of operation.

Figure 2A:
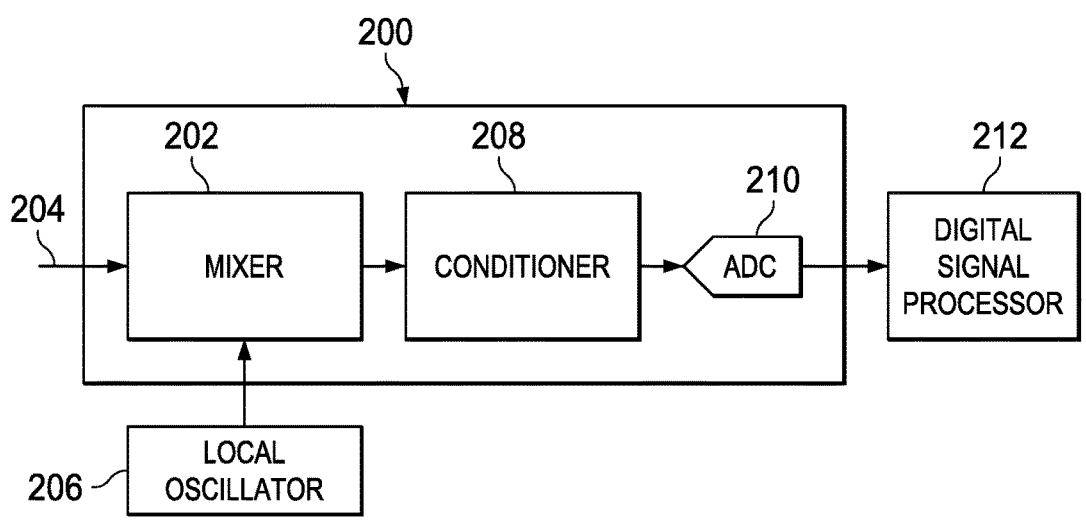
FIG. 2(a) illustrates a delay detect circuit, according to an embodiment.

FIG. 2(a) illustrates a delay detect circuit 200, according to an embodiment. The delay detect circuit 200 is similar in connections and operation to the delay detect circuit 108 illustrated in FIG. 1. The delay detect circuit 200 is explained with the help of radar apparatus 100. The delay detect circuit 200 includes a mixer 202. The mixer 202 receives a transmit signal 204 from the slave radar chip 152 on the second path 116. The mixer 202 also receives the transmit signal from the local oscillator 206. The local oscillator 206 is similar in connection and operation to the local oscillator 104 illustrated in FIG. 1. A conditioner 208 is coupled to the mixer 202.

The conditioner 208 amplifies and filters an output of the mixer 202 to generate a filtered signal. The filtered signal is provided to an ADC (analog to digital converter) 210 for sampling. The filtered signal is converted to a digital signal by the ADC 210. The delay detect circuit 200 provides the digital signal from the ADC 210 to a digital signal processor (DSP) 212.

The DSP 212 processes the digital signal during the calibration mode and estimates the routing delay. The DSP 212 uses the routing delay during the normal mode to estimate a position and a velocity of a plurality of obstacles. In one example, the DSP 212 is a digital hardware circuit that is part of the delay detect circuit 200. In another example, the DSP 212 is part of a transceiver unit of the plurality of transceiver units 110 in the radar apparatus 100.

In one example, when in calibration mode, a transmit signal generated by the local oscillator 206 is represented as (T):

$$T = \cos(2\pi \cdot Fc \cdot t) \quad (1)$$

where, Fc is a frequency of the local oscillator 206 and t represents time. If the length of the first path 114 and the length of the second path 116 is d, the transmit signal 204 received from the slave radar chip 152 on the second path 116 is represented as (T_ret):

$$T\_ret = \cos\left(2\pi \cdot Fc \cdot \left(t - \frac{2d}{c}\right)\right) \quad (2)$$

The mixer 202 multiplies T and T_ret. When the mixer 202 is a real mixer, the mixer 202 multiplies T and T_ret. When the mixer 202 is a complex mixer, the mixer 202 multiplies T_ret with imaginary T (Tc) and a real T (Tr).

The real T (Tr) and the imaginary T (Tc) are given as:

$$Tr = \cos(2\pi \cdot Fc \cdot t) \quad (3)$$

$$Tc = \cos\left(2\pi \cdot Fc \cdot t + \frac{\pi}{2}\right) \quad (4)$$

where, $$\frac{\pi}{2}$$

represents a phase mutt in the imaginary T (Tc) with respect to the real T (Tr). The real T (Tr) and imaginary T (Tc) are collectively referred to as complex signal T. The complex signal T is an output of the mixer 202. The terms imaginary, real and complex are motivated from the field of communications, signal processing, arithmetic and trigonometry; and represent sinusoids having 90 degree phase difference between themselves. An output of the mixer 202 is low pass filtered in the conditioner 208 to obtain a filtered signal (Tf):

$$Tf = e^{j2\pi \cdot Fc \cdot \frac{2d}{c}} \quad (5)$$

The filtered signal (Tf) is sampled in the ADC 210 to generate a digital signal. The DSP 212 processes the digital signal to measure a phase of the digital signal (Φ).

The phase of the digital signal (Φ) (given by equation (6)) is then used by the DSP 212 to estimate a routing delay (Dy) in the transmit signal from the master radar chip 102 to the slave radar chip 152 using the equation (7).

$$\Phi = 2\pi \cdot Fc \cdot \frac{2d}{c} \quad (6)$$

The routing delay (Dy) in the transmit signal is d/c which is given as:

$$Dy = d/c = \frac{\Phi}{4\pi Fc} + \frac{2\pi k}{4\pi Fc} \quad (7)$$

Dy represents a routing delay in the transmit signal from the master radar chip 102 to the slave radar chip 152. The routing delay (Dy) also includes a delay caused in the routing of the transmit signal from the master radar chip 102 to the slave radar chip 152 by circuit components such as (but not limited to) multiplexers, input buffers and output buffers present in a path of the transmit signal between the master radar chip 102 to the slave radar chip 152.

In the above equation, k is a positive integer, for example 0, 1, 2 and 3. In one example, an approximate value of the routing delay (Dy) is known based on a design of the radar apparatus. A value of k is selected as 0, 1, 2, 3, . . . when the routing delay (Dy) is known to be certainly between $$\frac{0}{2Fc} \text{ and } \frac{1}{2Fc}, \frac{1}{2Fc} \text{ and } \frac{2}{2Fc}, \frac{2}{2Fc} \text{ and } \frac{3}{2Fc}, \frac{3}{2Fc} \text{ and } \frac{4}{2Fc}, \ldots$$

respectively. Thus, an appropriate value of k is known before the use of the above described process of estimating the routing delay (Dy) accurately. The range of the routing delay (Dy) is not useful but is usually available based on the design of the radar apparatus. The above process helps in refining the routing delay (Dy) to an accurate value. This accurate value of the routing delay (Dy) is used by the radar apparatus 100 in estimating a position and velocity of an obstacle or of a plurality of obstacles in the normal mode of its operation.

In one example, the frequency Fc is selected based on an application of the radar apparatus 100. In another example, the frequency Fc is selected for efficient routing on the radar apparatus 100. In one application the frequency Fc is in the range of 18 GHz to 24 GHz while in other application the frequency Fc is in the range of 76 GHz to 81 GHz. In an additional example, d varies from 1 cm to 20 cm. In yet another example, a delay caused in the routing of the transmit signal from the master radar chip 102 to the slave radar chip 152 by circuit components such as (but not limited to) multiplexers, input buffers and output buffers present in a path of the transmit signal between the master radar chip 102 to the slave radar chip 152 is converted to an equivalent length for estimating d. Further, c which represents a speed of electromagnetic wave varies from $1 \times 10^8$ m/s to $3 \times 10^8$ m/s depending on a PCB or chip material used for the radar apparatus 100.

In another embodiment, a transmit signal generated by the local oscillator 206 includes two signals each having a different frequency given as Fc1 and Fc2. The two signals are transmitted one after another in two trials, and a processing similar to the one discussed in the previous embodiment is performed by the delay detect circuit 200 in each trial. The difference in the two frequencies Fc1 and Fc2 is represented by B. The DSP 212 measures the phase of the two digital signals obtained from ADC 210 and the phase values are represented as:

$$\Phi 1 = 2\pi \cdot Fc_1 \cdot \frac{2d}{c} \quad (8)$$

$$\Phi 2 = 2\pi \cdot Fc_2 \cdot \frac{2d}{c} \quad (9)$$

After finding these phase values, the DSP 212 uses them to find the routing delay (Dy) in the transmit signal as:

$$Dy = \frac{\Phi 2 + \Phi 1}{4\pi B} + \frac{2\pi k}{4\pi B} \quad (10)$$

Dy represents a routing delay in the transmit signal from the master radar chip 102 to the slave radar chip 152. The routing delay (Dy) also includes a delay caused in the routing of the transmit signal from the master radar chip 102 to the slave radar chip 152 by circuit components such as (but not limited to) multiplexers, input buffers and output buffers present in a path of the transmit signal between the master radar chip 102 to the slave radar chip 152.

In the above equation, k is a positive integer, for example 0, 1, 2 and 3. In one example, an approximate value of the routing delay (Dy) is known based on a design of the radar apparatus. A value of k is selected as 0, 1, 2, 3, . . . when the routing delay (Dy) is known to be certainly between $$\frac{0}{2Fc} \text{ and } \frac{1}{2Fc}, \frac{1}{2Fc} \text{ and } \frac{2}{2Fc}, \frac{2}{2Fc} \text{ and } \frac{3}{2Fc}, \frac{3}{2Fc} \text{ and } \frac{4}{2Fc}, \ldots$$

respectively. Thus, an appropriate value of k is known before the use of the above described process of estimating the routing delay (Dy) accurately. The range of the routing delay (Dy) is not useful but is usually available based on the design of the radar apparatus. The above process helps in refining the routing delay (Dy) to an accurate value. This accurate value of the routing delay (Dy) is used by the radar apparatus 100 in estimating a position and velocity of an obstacle or of a plurality of obstacles in the normal mode of its operation.

In one example, the frequencies Fc1 and Fc2 are selected based on an application of the radar apparatus 100. In another example, the frequencies Fc1 and Fc2 are selected for efficient routing on the radar apparatus 100. In one application the frequencies Fc1 and Fc2 are in the range of 18 GHz to 24 GHz while in other application the frequencies Fc1 and Fc2 are in the range of 76 GHz to 81 GHz. In an additional example, d varies from 1 cm to 20 cm. In yet another example, a delay caused in the routing of the transmit signal from the master radar chip 102 to the slave radar chip 152 by circuit components such as (but not limited to) multiplexers, input buffers and output buffers present in a path of the transmit signal between the master radar chip 102 to the slave radar chip 152 is converted to an equivalent length for estimating d.

Further, c which represents a speed of electromagnetic wave varies from $1 \times 10^8$ m/s to $3 \times 10^8$ m/s depending on a PCB or chip material used for the radar apparatus 100. In one version, B is selected based on a largest anticipated routing delay (Dy) between the master radar chip 102 to the slave radar chip 152 in the radar apparatus 100 and k is set to 0. In another version, B is in the range of 100 MHz to 4 GHz and k is set appropriately.

In an additional embodiment, a transmit signal generated by the local oscillator 206 is a ramp signal. A frequency of the ramp signal is a function of time and is given as Fc(t), where t represents time. The ramp signal has a start frequency $Fc_0$ and a slope S. The ramp signal is represented as:

$$Fc(t) = Fc_0 + S \times t \quad (11)$$

Thus, the transmit signal generated by the local oscillator 206 is represented as (T):

$$T = \cos(2\pi \cdot Fc(t) \cdot t) \quad (12)$$

When the length of the first path 114 and the length of the second path 116 is d, the transmit signal 204 received from the slave radar chip 152 on the second path 116 is represented as (T_ret):

$$T\_ret = \cos\left(2\pi \cdot Fc \cdot \left(t - \frac{2d}{c}\right) \cdot \left(t - \frac{2d}{c}\right)\right) \quad (13)$$

The mixer 202 multiplies T and T_ret. An output of the mixer 202 is low pass filtered in the conditioner 208 to obtain a filtered signal (Tf):

$$Tf = e^{j2\pi \cdot S \frac{2d}{c} t} \quad (14)$$

The filtered signal (Tf) is sampled in the ADC 210 to generate a digital signal which is provided to the DSP 212. The DSP 212 processes the digital signal to measure a frequency of the signal (Fr). For example, a fast fourier transform of the digital signal is performed and the frequency corresponding to the FFT's maximum absolute value is the frequency of the signal (Fr). The DSP 212 uses the measured frequency of the signal (Fr) to estimate a routing delay (Dy) in the transmit signal from the master radar chip 102 to the slave radar chip 152. The frequency of the signal (Fr) and d are related as:

$$Fr = S \frac{2d}{c} \quad (15)$$

The DSP 212 estimates the value of the routing delay (Dy) in the transmit signal using the following equation:

$$Dy = d/c = \frac{Fr}{2S} \quad (16)$$

Dy represents a routing delay in the transmit signal from the master radar chip 102 to the slave radar chip 152. The routing delay (Dy) also includes a delay caused in the routing of the transmit signal from the master radar chip 102 to the slave radar chip 152 by circuit components such as (but not limited to) multiplexers, input buffers and output buffers present in a path of the transmit signal between the master radar chip 102 to the slave radar chip 152. The routing delay (Dy) is used by the radar apparatus 100 in estimating a position and velocity of an obstacle or of a plurality of obstacles in the normal mode of its operation.

In one example, the frequency $Fc_0$ is selected based on an application of the radar apparatus 100. In another example, the frequency $Fc_0$ is selected for efficient routing on the radar apparatus 100. In one application the frequency $Fc_0$ is in the range of 18 GHz to 24 GHz while in other application the frequency $Fc_0$ is in the range of 76 GHz to 81 GHz. In an additional example, d varies from 1 cm to 20 cm. In yet another example, a delay caused in the routing of the transmit signal from the master radar chip 102 to the slave radar chip 152 by circuit components such as (but not limited to) multiplexers, input buffers and output buffers present in a path of the transmit signal between the master radar chip 102 to the slave radar chip 152 is converted to an equivalent length for estimating d.

Further, c which represents a speed of electromagnetic wave varies from 1 m/s to $3 \times 10^8$ m/s depending on a PCB or chip material used for the radar apparatus 100. In one version, the slope S is selected based on a farthest obstacle required to be detected by the radar apparatus 100. In another version, the slope S is in the range of 1 MHz/micro-second to 200 MHz/micro-second.

Figure 2B:
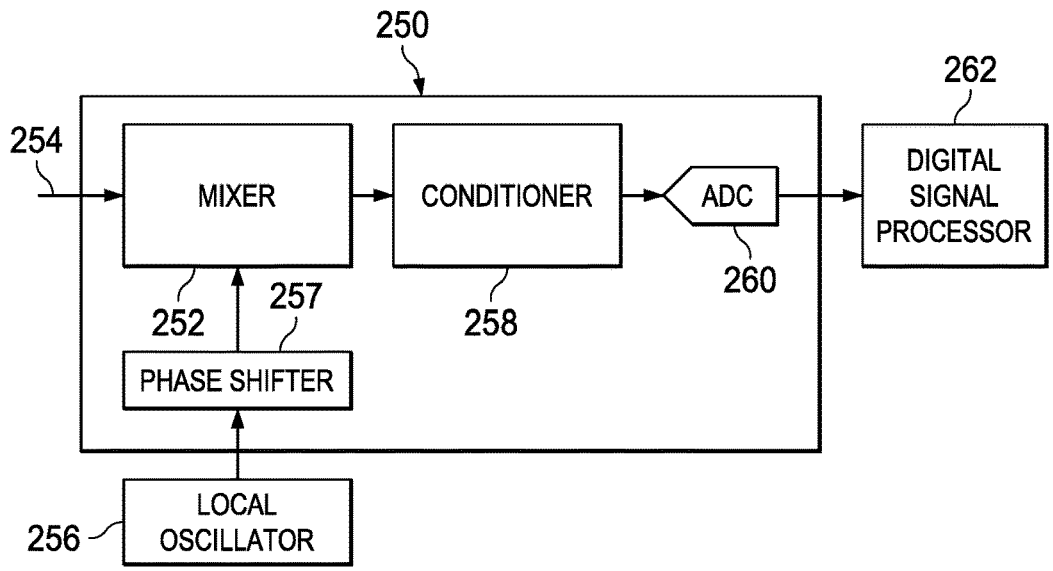
FIG. 2(b) illustrates a delay detect circuit, according to another embodiment.

FIG. 2(b) illustrates a delay detect circuit 250, according to another embodiment. The delay detect circuit 250 is similar in connections and operation to the delay detect circuit 108 illustrated in FIG. 1. The delay detect circuit 250 is explained with the help of radar apparatus 100. The delay detect circuit 250 includes a mixer 252. The mixer 252 receives a transmit signal 254 from the slave radar chip 152 on the second path 116. The mixer 252 is coupled to a phase shifter 257 and the phase shifter 257 is coupled to the local oscillator 256. The local oscillator 256 is similar in operation to the local oscillator 104 illustrated in FIG. 1. The mixer 252 receives the transmit signal from the local oscillator 256 through the phase shifter 257.

A conditioner 258 is coupled to the mixer 252. The conditioner 258 amplifies and filters an output of the mixer to generate a filtered signal. The filtered signal is provided to an ADC (analog to digital converter) 260 for sampling. The filtered signal is converted to a digital signal by the ADC 260. The delay detect circuit 250 provides the digital signal from the ADC 260 to a digital signal processor (DSP) 262.

The DSP 262 processes the digital signal during the calibration mode and estimates the routing delay. The DSP 262 uses the routing delay during the normal mode to estimate a range and a velocity of a plurality of obstacles. In one example, the DSP 262 is a digital hardware circuit and is part of the delay detect circuit 250. In another example, the DSP 262 is part of a transceiver unit of the plurality of transceiver units in the radar apparatus 100.

The operation of the delay detect circuit 250 illustrated in FIG. 2(b) is explained now. The phase shifter 257 introduces a phase shift in the transmit signal received from the local oscillator 256. In an example, the phase shifter introduces a phase shift of 0° to generate a first transmit signal and a phase shift of 180° to generate a second transmit signal. It is to be noted that the first transmit signal and the second transmit signal are generated at different time instants.

An output of the mixer 252 and the conditioner 258 are a first filtered signal and a second filtered signal corresponding to the first transmit signal and the second transmit signal respectively. These first and second filtered signals are sampled by the ADC 260 to obtain a first digital signal and a second digital signal respectively. A difference in the first digital signal and the second digital signal is used in the DSP 262 to estimate a routing delay in the transmit signal from the master radar chip 102 to the slave radar chip 152.

The value of routing delay is used by the radar in estimating a position and a velocity of an obstacle or plurality of obstacles. The difference in the first filtered signal and the second filtered signal eliminates the adverse effects of any DC offsets in the radar apparatus 100. The use of delay detect circuit 200 or the delay detect circuit 250 in the radar apparatus 100 estimates a routing delay in the transmit signal generated in the master radar chip 102 and traversing to the slave radar chip 152 and returning back to the master radar chip 102.

The routing delay is used by the radar apparatus 100 in better estimating position and velocity of an obstacle or plurality of obstacles. This is even more important when there is a plurality of radar chips in the radar apparatus 100. One or more embodiments discussed above are used to estimate the routing delay between signals emitted by the transceiver units in the plurality of radar chips. In another embodiment, 0 degree and 90 degree phase shift choices are used in two trials. The processing of the two trials is similar to the complex mixer embodiment but with the advantage that single instances of real mixer and analog hardware is used instead of two.

In yet another embodiment, the phase shifter 257 introduces a phase shift that varies with time in a known pattern. For example, a positive phase pattern ψ is introduced in the phase shifter 257 and a negative phase pattern −ψ is introduced on the data obtained from the ADC 260 before further processing by the DSP 262. The processing is similar to the complex mixer embodiment. This eliminates the adverse effects of any non-linearity in the mixer 252 of the delay detect circuit 250. It also eliminates any DC offsets and undesired electromagnetic coupling between the local oscillator 256 and the mixer 252 in the delay detect circuit 250.

In another embodiment, the phase shifter 257 introduces a defined phase shift which is then either increased or decreased with time at a constant rate, resulting in a frequency shift. In one example, the defined phase shift is phase 0 and frequency shift is $F_{shift}$. Similarly, defined phase of −phase 0 and a corresponding frequency shift of −$F_{shift}$ are introduced on the data obtained from the ADC 260 before further processing by the DSP 262. The processing is similar to the complex mixer embodiment. This eliminates the adverse effects of any non-linearity in the mixer 252 of the delay detect circuit 250. It also eliminates any DC offsets and undesired electromagnetic coupling between the local oscillator 256 and the mixer 252 in the delay detect circuit 250. As an example, the phase 0 is a phase between 0 and 360 degrees and $F_{shift}$ is a frequency of 1 MHz.

Figure 3:
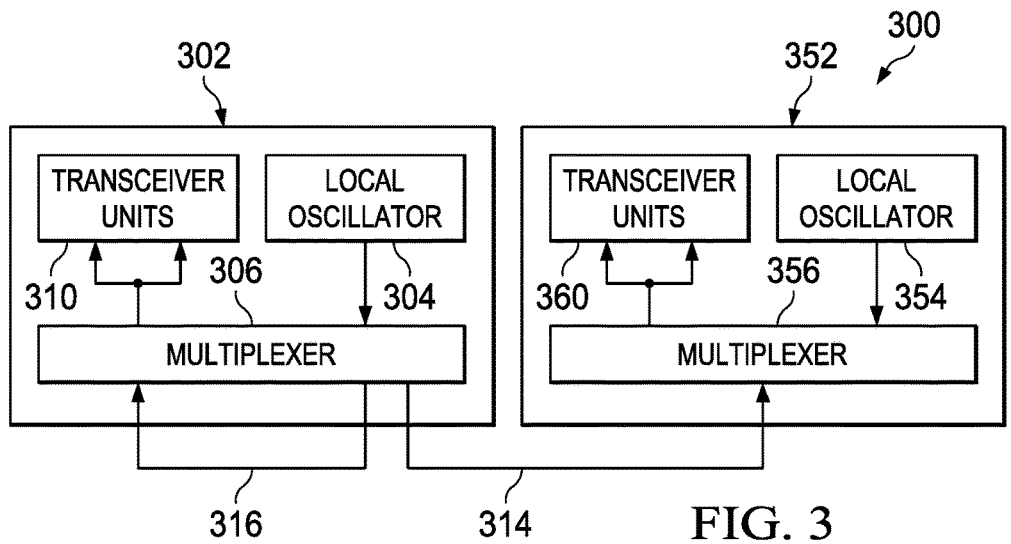
FIG. 3 illustrates a radar apparatus, according to still yet another embodiment.

FIG. 3 illustrates a radar apparatus 300, according to still yet another embodiment. The radar apparatus 300 includes a master radar chip 302 and a slave radar chip 352. The master radar chip 302 includes a local oscillator 304. A multiplexer 306 is coupled to the local oscillator 304. A plurality of transceiver units 310 are coupled to the multiplexer 306.

Each transceiver unit of the plurality of transceiver units 310 includes at least one of a transmit unit and a receive unit. In one example, a transceiver unit of the plurality of transceiver units 310 includes one or more transmit units. In another example, a transceiver unit of the plurality of transceiver units 310 includes one or more receive units. In yet another example, a transceiver unit of the plurality of transceiver units 310 includes one or more transmit units and one or more receive units.

An external path 316 is coupled to the multiplexer 306. In one version, the external path 316 is part of a PCB (printed circuit board) containing the radar apparatus 300. The slave radar chip 352 includes a local oscillator 354. A multiplexer 356 is coupled to the local oscillator 354. A plurality of transceiver units 360 are coupled to the multiplexer 356. In one example, the local oscillator 354 in the slave radar chip 352 is deactivated.

Each transceiver unit of the plurality of transceiver units 360 includes at least one of a transmit unit and a receive unit. In one example, a transceiver unit of the plurality of transceiver units 360 includes one or more transmit units. In another example, a transceiver unit of the plurality of transceiver units 360 includes one or more receive units. In yet another example, a transceiver unit of the plurality of transceiver units 360 includes one or more transmit units and one or more receive units.

In an embodiment, the radar apparatus 300 includes a plurality of radar chips and one or more radar chips of the plurality of radar chips are configured as master radar chips and one or more radar chips of the plurality of radar chips are configured as slave radar chips. As illustrated in the radar apparatus 300, the master radar chip 302 and the slave radar chip 352 are similar in connections i.e. the master radar chip 302 and the slave radar chip 352 are identical. This is advantageous since a chip manufacturer has to manufacture only one kind of chip and a user can program these chip according to the usage in the respective designs.

In another example, the master radar chip 302 and the slave radar chip 352 are not identical, and may contain different number of transceiver units. Also, the local oscillator may be present only in the master radar chip 302. In yet another example, a user programs one chip as a master radar chip and the remaining chips on the radar apparatus 300 as slave radar chips by activating a local oscillator on the master radar chip and deactivating a local oscillator on the slave radar chips. In an embodiment, the plurality of transceiver units 310 and the local oscillator 304 in the master radar chip 302 are integrated on a single chip.

Similarly, the plurality of transceiver units 360 and the local oscillator 354 in the slave radar chip 352 are integrated on a single chip. Therefore, an architecture such as architecture of the radar apparatus 300 is advantageous since the plurality of transceiver units are split on two chips i.e. on the master radar chip 302 and the slave radar chip 352. This reduces the overall area required by each chip and also reduces the power consumption and heat dissipation of each chip, hence resulting in lower chip cost and lower cost of the radar apparatus 300. The radar apparatus 300 may include one or more additional components known to those skilled in the relevant art and are not discussed here for simplicity of the description.

The operation of radar apparatus 300 illustrated in FIG. 3 is explained now. The local oscillator 304 in the master radar chip 302 generates a transmit signal. In an example, when the radar apparatus contains only one chip, the local oscillator 304 is coupled to the plurality of transceiver units 310 and hence provides the transmit signal directly to the plurality of transceiver units 310. The multiplexer 306 in the master radar chip 302 receives the transmit signal from the local oscillator 304.

The multiplexer 306 sends the transmit signal to the slave radar chip 352 on a first path 314. The multiplexer 306 provides the transmit signal to the external path 316. The external path 316 receives the transmit signal from the master radar chip 302 and provides the transmit signal back to the master radar chip 302. The multiplexer 306 also provides the transmit signal received from the external path 316 to the plurality of transceiver units 310.

The slave radar chip 352 receives the transmit signal from the master radar chip 302 on the first path 314. The multiplexer 356 receives the transmit signal on the first path 314 from the master radar chip 302. The multiplexer 356 provides the transmit signal received on the first path 314 to the plurality of transceiver units 360 in the slave radar chip 352.

A path from the multiplexer 306 in the master radar chip 302 to the multiplexer 356 in the slave radar chip 352 is the first path 314. In one example, a length of the external path 316 is equal to a length of the first path 314. A routing delay on the first path 314 is equal to a routing delay on the external path 316 i.e. a time delay when the transmit signal is emitted from the multiplexer 306 and reaches multiplexer 356 on the first path 314 is equal to the time delay when the transmit signal is emitted from the multiplexer 306 and reaches back the multiplexer 306 on the external path 316.

Therefore, the signal provided to the transceiver units 310 in the master radar chip 302 is same as the signal provided to the transceiver units 360 in the slave radar chip 352 as a signal propagation delay in both is same. Thus, the transceiver units in the master radar chip 302 and the slave radar chip 352 utilize a same signal for estimating a position and a velocity of an obstacle or plurality of obstacles i.e. the transmit signal from the local oscillator 304 to all the transceiver units in the radar apparatus 300 is time synchronous. It is noted that the above embodiment is explained with the help of two radar chips for better clarity and is understood not to limit the scope of the present disclosure. The embodiment is applicable when there is a plurality of radar chips in the radar apparatus 300.

In a yet still another embodiment, when there is one master radar chip and a plurality of slave radar chips, a length of the external path coupled to the master radar chip is equal to a length of a first path from the master radar chip to each slave radar chip of the plurality of slave radar chips. In an embodiment, the radar apparatus 100 is in a form of a star arrangement in which the master radar chip is in a center of a circle and the plurality of slave radar chips are on a circumference of the circle.

It is understood that the various embodiments aim to achieve equal routing delay from the local oscillator 304 to each transceiver unit of the plurality of transceiver units (310 and 360). This provides time synchronous signal being transmitted and received by each transceiver unit of the plurality of transceiver units. The routing delays are made substantially equal by using one of the following (but not limited to) delaying circuit, buffers and routing wire lengths. These schemes ensure that the routing delay from the local oscillator 304 to each of the transceiver unit is substantially equal. The extent of routing delay matching is limited by the printed circuit board design and circuit wire placement congestions.

In an example, the multiplexer 306 send the transmit signal to the slave radar chip 352 through an output buffer. The output buffer amplifies the transmit signal so as to compensate for a routing loss incurred by the transmit signal while traversing from the master radar chip 302 to the slave radar chip 352. In another example, the multiplexer 356 receives the transmit signal from the master radar chip 302 through an input buffer. The input buffer amplifies the transmit signal so as to compensate for a routing loss incurred by the transmit signal while traversing from the master radar chip 302 to the slave radar chip 352.

In still another example, a frequency of the transmit signal sent and received by the master radar chip 302 on the first path 314 and the second path 316 is equal to a frequency of the local oscillator 304. The frequency of the local oscillator 304 is one of the following ranges, but not limited to 76 GHz to 81 GHz or 18 GHz to 24 GHz. The frequency of the local oscillator 304, in one example, is dependent on an operating frequency band of the radar apparatus 300.

In yet another example, the frequency of the transmit signal sent by the master radar chip 302 on the first path 314 and the frequency of the transmit signal sent by the slave radar chip 352 on the second path 316 is divided by an integer factor. For example, the integer factor is one of (but not limited to) 2, 3, and 20. Frequency divider circuits are used to generate a divided frequency signal. Frequency division is advantageous as it provides reduction in power loss during routing of transmit signal in printed circuit boards.

The transmit signal received by the master radar chip 302 on the second path 316 and the transmit signal received by the slave radar chip 352 on the first path 314 are multiplied by the same integer factor to match the frequency of the transmit signal from the local oscillator 304. Frequency multiplier circuits, such as phase lock loops, frequency lock loops and self-mixers are used to realize the above mentioned frequency multiplication.

Figure 4:
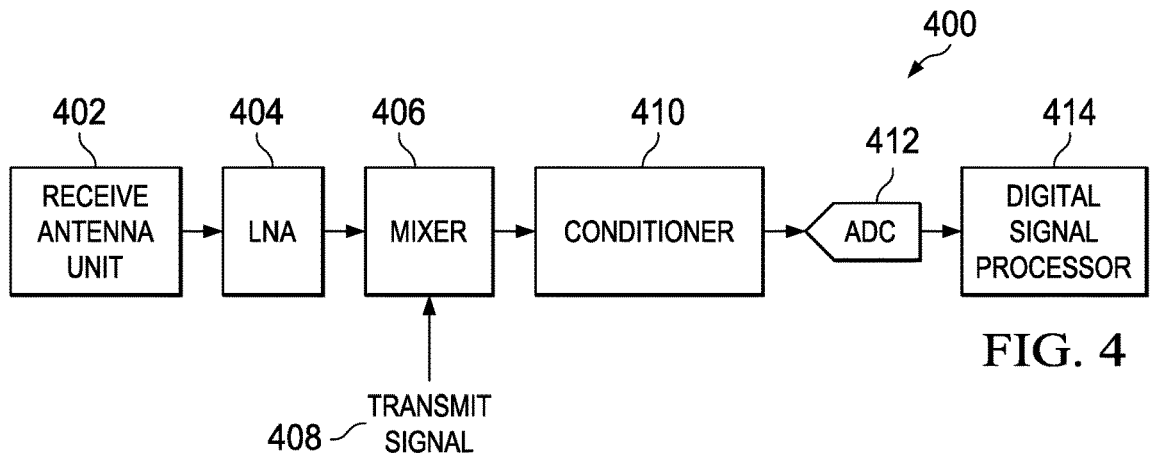
FIG. 4 illustrates a receive unit, according to a further embodiment.

FIG. 4 illustrates a receive unit 400, according to a further embodiment. The receive unit 400 is a receive unit in either one of the plurality of transceiver units 110, the plurality of transceiver units 160, the plurality of transceiver units 310 or the plurality of transceiver units 360. The receive unit 400 includes a receive antenna unit 402. A low-noise amplifier (LNA) 404 is coupled to the receive antenna unit 402. A mixer 406 is coupled to the LNA 404 and also receive a transmit signal 408.

In one example, a multiplier receives the transmit signal 408 and provides the transmit signal 408 to the mixer 406. The transmit signal 408 is similar to the transmit signal generated by the local oscillator 104 or to the transmit signal generated by the local oscillator 304. In an example, in the radar apparatus 100 or the radar apparatus 300, the mixer 406 is coupled to the multiplexer 106 or the multiplexer 306 respectively and receives the transmit signal provided by the respective multiplexer.

In another example, in the radar apparatus 100 or the radar apparatus 300, a multiplier receives the transmit signal 408 from the multiplexer 106 or the multiplexer 306. A conditioner 410 is coupled to the mixer 406. An ADC 412 is coupled to the conditioner 410. In an embodiment, the conditioner is not present in the receive unit 400 and the ADC 412 is coupled to the mixer 406. A digital signal processor (DSP) 414 is coupled to the ADC 412. The receive unit 400 may include one or more additional components known to those skilled in the relevant art and are not discussed here for simplicity of the description.

The operation of the receive unit 400 illustrated in FIG. 4 is explained now. A transmit unit in a radar apparatus, for example radar apparatus 100, transmits the transmit signal 408. The transmit signal 408 is scattered by a plurality of obstacles to generate a scattered signal. The receive antenna unit 402 receives the scattered signal. The LNA 404 amplifies the scattered signal. In an example, when the multiplier receives the transmit signal 408, the multiplier is configured to generate an output signal which is an integer multiple of a frequency of the transmit signal 408. In one version, the integer is one of the following (but not limited to) 1, 2, 3 and 4.

In yet another example, the multiplier receives the transmit signal 408 and generates an offset from the frequency of the transmit signal 408. In one version, the offset is a frequency in a range of −100 MHz to +100 MHz. The output signal of the multiplier is provided to the mixer 406. The mixer 406 mixes the amplified scattered signal from the LNA 404 and the output signal to generate an intermediate frequency (IF) signal. In one version, the mixer 406 multiplies the amplified scattered signal from the LNA 404 and the transmit signal 408 to generate an intermediate frequency (IF) signal.

The conditioner 410 is configured to amplify and filter the IF signal received from the mixer 406. In one example, the conditioner 410 either amplify or filter the IF signal. The ADC 412 receives the IF signal from the conditioner 410 and samples the IF signal to generate a sampled data. The digital signal processor 414 receives the sampled data from the ADC 412 and estimates a position and a velocity of the plurality of obstacles. In another example, in the radar apparatus 100, the DSP 414 is coupled to the delay detect circuit 108. The DSP 414 receives the sampled data from the ADC 412 and the routing delay from the delay detect circuit 108. The DSP 414 estimates a position and a velocity of the plurality of obstacles from the sampled data and the routing delay.

Figure 5:
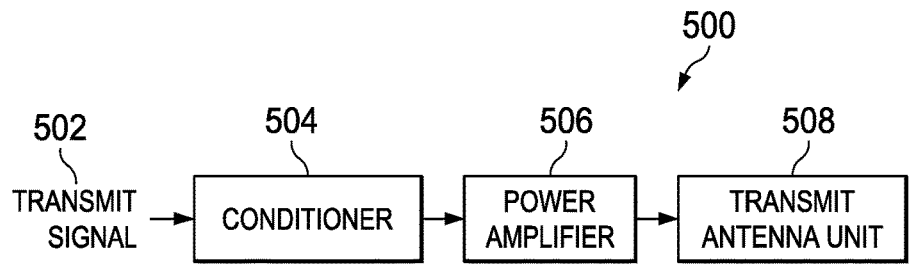
FIG. 5 illustrates a transmit unit, according to yet a further embodiment.

FIG. 5 illustrates a transmit unit 500, according to yet a further embodiment. The transmit unit 500 is a transmit unit in either one of the plurality of transceiver units 110, the plurality of transceiver units 160, the plurality of transceiver units 310 or the plurality of transceiver units 360. The transmit unit 500 includes a conditioner 504 that receives a transmit signal 502. The transmit signal 502 is similar to the transmit signal generated by the local oscillator 104 or to the transmit signal generated by the local oscillator 304.

A power amplifier 506 is coupled to the conditioner 504. In an embodiment, the transmit unit 500 does not include the conditioner 504 and the power amplifier 506 receives the transmit signal 502. In an example, in the radar apparatus 100 or the radar apparatus 300, the power amplifier 506 is coupled to the multiplexer 106 or the multiplexer 306 respectively and receives the transmit signal 502. A transmit antenna unit 508 is coupled to the power amplifier 506. The transmit unit 500 may include one or more additional components known to those skilled in the relevant art and are not discussed here for simplicity of the description.

The operation of the transmit unit 500 illustrated in FIG. 5 is explained now. The conditioner 504 is configured to perform at least one of the phase shift frequency multiplication and amplification of the transmit signal 502. In an example, the conditioner 504 is configured to generate an output signal which is an integer multiple of a frequency of the transmit signal 502. In one version, the integer is one of the following (but not limited to) 1, 2, 3 and 4.

In another example, the conditioner 504 receives the transmit signal 502 and generates an offset from the frequency of the transmit signal 502. In one version, the offset is a frequency in a range of −100 MHz to +100 MHz. The power amplifier 506 receives the transmit signal 502 from the conditioner 504 and amplifies the transmit signal 502. The transmit antenna unit 508 transmits the transmit signal 502 received from the power amplifier 506. The transmit signal is scattered by a plurality of obstacles to generate a scattered signal.

Figure 6:
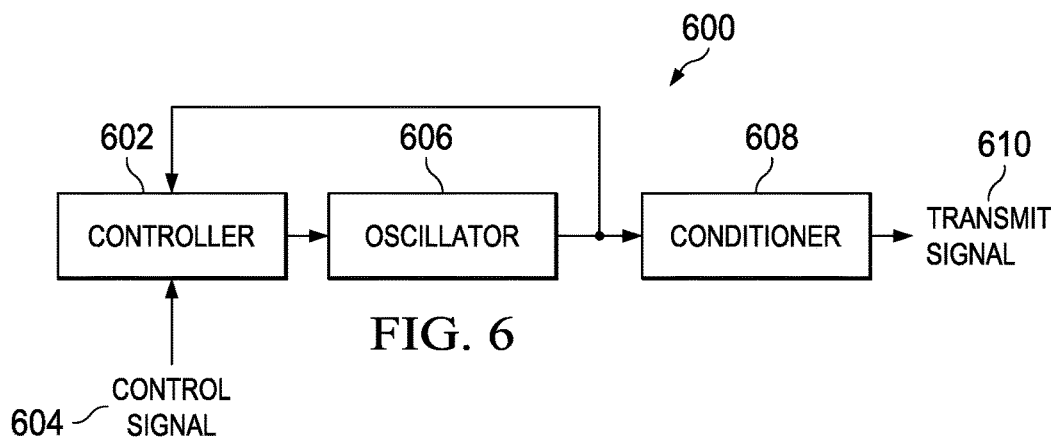
FIG. 6 illustrates a local oscillator, according to still a further embodiment.

FIG. 6 illustrates a local oscillator 600, according to still a further embodiment. The local oscillator 600 is similar to the local oscillator 104 or the local oscillator 304. The local oscillator includes a controller 602 that receives a control signal 604. An oscillator 606 is coupled to the controller 602. An output of the oscillator is provided as feedback to the controller 602. A conditioner 608 is coupled to the oscillator 608. The conditioner generate a transmit signal 610. The transmit signal 610 is similar to the transmit signal generated by the local oscillator 104 or to the transmit signal generated by the local oscillator 304. The local oscillator 600 may include one or more additional components known to those skilled in the relevant art and are not discussed here for simplicity of the description.

The operation of the local oscillator 600 illustrated in FIG. 6 is explained now. The local oscillator 600 in one example is a closed loop PLL (phase locked loop) or a closed loop FLL (frequency locked loop). The local oscillator 600 in another example is an open loop VCO (voltage controlled oscillator) or an open loop DCO (digital controlled oscillator). The oscillator 608 generates the transmit signal 610 which is provided as feedback to the controller 602.

The control signal 604 is a reference signal provided to the controller 602. The controller 602 modulates the transmit signal 608 received from the oscillator 606 as feedback in reference to the control signal 604. The conditioner 608 is configured to perform at least one of the phase shift, multiplication and amplification of the transmit signal 610. In an example, the transmit signal 610 is provided to the multiplexer 106 in the radar apparatus 100 or to the multiplexer 306 in the radar apparatus 300.

Figure 7:
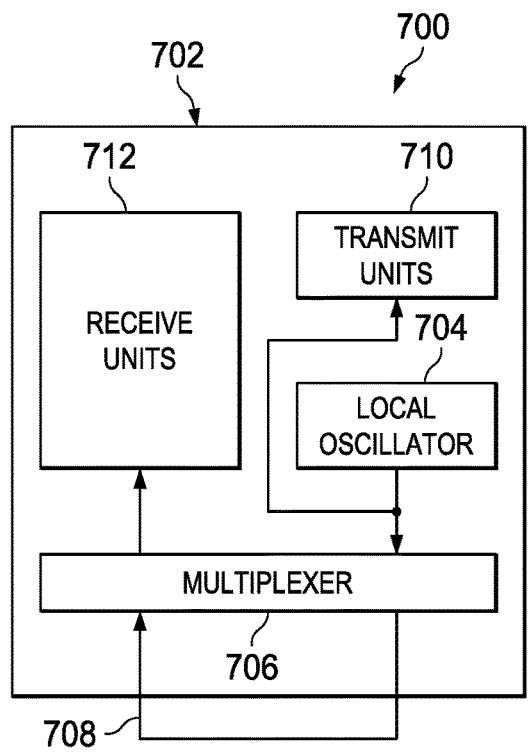
FIG. 7 illustrates a radar apparatus, according to yet still a further embodiment.

FIG. 7 illustrates a radar apparatus 700, according to yet still a further embodiment. The radar apparatus 700 includes a master radar chip 702. The master radar chip 702 includes a local oscillator 704. A multiplexer 706 is coupled to the local oscillator 704. A plurality of transmit units 710 are coupled to the local oscillator 704. A plurality of receive units 712 are coupled to the multiplexer 706. An external path 708 is coupled to the multiplexer 706. In one example the external path 708 is part of a PCB (printed circuit board) containing the radar apparatus 700.

In one embodiment, the radar apparatus 700 includes a plurality of radar chips and one or more radar chips of the plurality of radar chips are configured as master radar chips and one or more radar chips of the plurality of radar chips are configured as slave radar chips. In another embodiment, the plurality of transmit units 710, the plurality of receive units 712 and the local oscillator 704 in the master radar chip 702 are integrated on a single chip. In an example, the radar apparatus 700 is integral with a vehicle. The radar apparatus 700 may include one or more additional components known to those skilled in the relevant art and are not discussed here for simplicity of the description.

The operation of radar apparatus 700 illustrated in FIG. 7 is explained now. The local oscillator 704 in the master radar chip 702 generates a transmit signal. The multiplexer 706 in the master radar chip 702 receives the transmit signal from the local oscillator 704. The multiplexer 706 provides the transmit signal to the external path 708. The external path 708 receives the transmit signal from the master radar chip 702 and provides the transmit signal back to the master radar chip 702. The multiplexer 706 provides the transmit signal received from the external path 708 to the plurality of receive units 712.

A routing delay on the external path 708 is equal to a time difference between a time instant when the transmit signal is transmitted by a transmit unit of the plurality of transmit units 710 and a time instant when a received signal is received by a receive unit of the plurality of receive units 712. In an example, the transmit signal may electromagnetically couple from a transmit unit to a receive unit. The electromagnetically coupled signal received by the receive unit may have very high signal strength.

The transmit signal is reflected by a known obstacle to generate the received signal. In one example, the known obstacle is a body of the vehicle such as bumper of the vehicle. When the radar apparatus 700 is integral with the vehicle, the bumper of the vehicle acts as a strong reflector.

Thus, the transmit signal transmitted by the transmit unit will be reflected by the bumper of the vehicle to generate the received signal which is received by the receive unit after a defined delay. The defined delay is the time difference between the time instant when the transmit signal is transmitted by a transmit unit and the time instant when the received signal is received by the receive unit. Since a position of antenna units (both transmit antenna units and receive antenna units) in the radar apparatus 700 are fixed and also, the position of the radar apparatus with respect to the bumper of the vehicle is also fixed, the defined delay is known to a designer of the vehicle or a designer of the radar apparatus 700.

Thus, the routing delay on the external path 708 is designed to be equal to the defined delay. A length of the external path 708 is designed such that it achieves the defined delay. In one version, the length of the external path 708 is designed such that it achieves a delay equal to the defined delay. In another version, a matching of the routing delay and the defined delay is limited by the following (but not limited to) distance between a transmit antenna and a receive antenna, distance between a bumper of the vehicle and the radar apparatus 700, printed circuit board design and circuit wire placement congestion.

Therefore, when the transmit signal received from the external path 708 is provided to a mixer in the receive unit of the plurality of receive units, the mixer mixes the transmit signal received from the multiplexer 706 and the received signal from the known obstacle. This cancels a phase noise arising in the receive unit because of the received signal and thus enables better detection of a position and a velocity of an obstacle or plurality of obstacles.

One skilled in art will realize that the mixer in the receive unit subtracts a phase noise of the received signal from a phase noise of the transmit signal, and this subtraction cancels the transmit signal phase noise. The defined delay provided to the external path 708 results in higher correlation in the received signal and the transmit signal and thus improves the performance of the radar apparatus 700. The embodiment is applicable also when there is a plurality of radar chips in the radar apparatus 700. The embodiment may optionally be enabled or disabled by using the multiplexer 706 that selects between the transmit signal from the external path 708 and the transmit signal from the local oscillator 704.

In one example, the defined delay varies from 0 to 10 nano seconds. The defined delay is dependent on a radar chip and the various vehicles using these radar chips. To compensate for such a delay, a very large circuit is required to be integrated in the radar apparatus 700. This would unduly increase the size of the radar apparatus 700 and the overall costs. Therefore, an external path such as external path 708 provides a feasible solution for compensating the defined delay.

The solution is advantageous for the radar chip manufacturers as they can manufacture the radar chips irrespective of the application and/or vehicles where the radar chips are used. Based on the application, the radar chip manufacturers can later design the external path 708 on the printed circuit boards. In one example, the radar chip manufactures use input and output buffers for providing the requisite delay.

In one version, the transmit signal from the local oscillator 704 is sent on the external path 708 and received by receive units 712. The frequency of the local oscillator 704 is one of the following ranges, but not limited to 76 GHz to 81 GHz or 18 GHz to 24 GHz. The frequency of the local oscillator 704, in one example, is dependent on an operating frequency band of the radar apparatus 700.

In another example, the frequency of the local oscillator sent by the radar apparatus 700 on the external path is divided by an integer factor. For example, the integer factor is one of (but not limited to) 2, 3, and 20. Frequency divider circuits are used to generate a divided frequency signal. Frequency division is advantageous as it provides reduction in power loss during routing of transmit signal in printed circuit boards.

The transmit signal received by the radar apparatus on the external path 708 is multiplied by the same integer factor to match the frequency of the transmit signal from the local oscillator 104. Frequency multiplier circuits, such as phase lock loops, frequency lock loops and self-mixers are used to realize the above mentioned frequency multiplication.

One having ordinary skill in the art will understand that the present disclosure, as discussed above, may be practiced with steps and/or operations in a different order, and/or with hardware elements in configurations which are different than those which are disclosed. Therefore, although the disclosure has been described based upon these preferred embodiments, it should be appreciated that certain modifications, variations, and alternative constructions are apparent and well within the spirit and scope of the disclosure. In order to determine the metes and bounds of the disclosure, therefore, reference should be made to the appended claims.

What is claimed is:

1. A method to operate a radar apparatus which estimates a position and a velocity of an obstacle by transmitting a transmit signal and receiving a scattered signal by the obstacle, comprising:
    generating the transmit signal by a master radar chip;
    receiving the transmit signal on a first path by a slave radar chip;
    sending the transmit signal on a second path to the master radar chip; and
    estimating a routing delay from the transmit signal received on the second path and from the transmit signal generated by the master radar chip.

2. The method of claim 1 further comprising:
    generating the transmit signal by a local oscillator in the master radar chip;
    sending the transmit signal to the slave radar chip on the first path by a multiplexer coupled to the local oscillator;
    receiving the transmit signal on the first path by a multiplexer in the slave radar chip;
    sending the transmit signal on the second path by the multiplexer in the slave radar chip; and
    receiving the transmit signal on the second path by the multiplexer in the master radar chip.

3. The method of claim 1 further comprising equalizing a length of the first path and a length of the second path.

4. The method of claim 1 further comprising amplifying the transmit signal before transmitting the transmit signal.

5. The method of claim 1, wherein estimating the position and the velocity of the obstacle further comprises:
    receiving the scattered signal;
    amplifying the scattered signal;
    mixing the scattered signal and the transmit signal to generate an IF (intermediate frequency) signal; and
    sampling the IF signal to generate a sampled data.

6. A method to operate a radar apparatus which estimates a position and a velocity of an obstacle by transmitting a transmit signal and receiving a scattered signal by the obstacle, comprising:
    generating the transmit signal by a master radar chip;
    receiving the transmit signal on a first path by a slave radar chip;
    sending the transmit signal on an external path coupled to the master radar chip; and
    providing the transmit signal on the external path back to the master radar chip.

7. The method of claim 6 further comprising equalizing a routing delay of the first path and a routing delay on the external path.

8. The method of claim 6 further comprising:
    generating the transmit signal by a local oscillator in the master radar chip;
    sending the transmit signal to the slave radar chip on the first path by a multiplexer coupled to the local oscillator; and
    receiving the transmit signal on the first path by a multiplexer in the slave radar chip.

9. The method of claim 6, wherein a path from the multiplexer in the master radar chip to the multiplexer in the slave radar chip is the first path.

10. The method of claim 6, wherein each of the master radar chip and the slave radar chip comprises one or more transceiver units, and each transceiver unit comprises at least one of a transmit unit and a receive unit.

11. The method of claim 10 further comprising:
    providing the transmit signal received on the external path to each transceiver unit on the master radar chip; and providing the transmit signal received on the first path to each transceiver unit on the slave radar chip.

12. The method of claim 10 further comprising amplifying the transmit signal before transmitting the transmit signal.

13. The method of claim 10, wherein estimating the position and the velocity of the obstacle further comprises:
   receiving the scattered signal;
   amplifying the scattered signal;
   mixing the scattered signal and the transmit signal to generate an IF (intermediate frequency) signal; and
   sampling the IF signal to generate a sampled data.

14. A method to operate a radar apparatus which estimates a position and a velocity of an obstacle by transmitting a transmit signal and receiving a scattered signal by the obstacle, comprising:
   Generating the transmit signal in a master radar chip;
   providing the transmit signal to a plurality of transmit units in the master radar chip;
   sending the transmit signal on an external path coupled to the master radar chip;
   receiving the transmit signal from the external path by the master radar chip; and
   providing the transmit signal received from the external path to a plurality of receive units in the master radar chip.

15. The method of claim 14 further comprising amplifying the transmit signal before transmitting the transmit signal.

16. The method of claim 14, wherein estimating the position and the velocity of the obstacle further comprises:
   receiving the scattered signal;
   amplifying the scattered signal;
   mixing the scattered signal and the transmit signal to generate an IF (intermediate frequency) signal; and
   sampling the IF signal to generate a sampled data.

17. The method of claim 14 further comprising equalizing a routing delay on the external path to a time difference between a time instant the transmit signal is transmitted by a transmit unit of the plurality of transmit units and a time instant when a received signal is received by a receive unit of the plurality of receive units, wherein the transmit signal is reflected by a known obstacle to generate the received signal.

18. The method of claim 17, wherein the known obstacle is a body of the vehicle.

19. The method of claim 14 further comprising equalizing a routing delay on the external path to a time difference between a time instant the transmit signal is transmitted by a transmit unit of the plurality of transmit units and a time instant when a received signal is received by a receive unit of the plurality of receive units, wherein the transmit signal couples electromagnetically from the transmit unit to the receive unit to generate the received signal.

20. The method of claim 2, wherein a path from the multiplexer in the master radar chip to the multiplexer in the slave radar chip is the first path and a path from the multiplexer in the slave radar chip to the multiplexer in the master radar chip is the second path.

* * * * *